(12) United States Patent
Gill et al.

(10) Patent No.: US 9,098,846 B2
(45) Date of Patent: Aug. 4, 2015

(54) CONTACTLESS AUTOMATED TELLER MACHINE

(75) Inventors: Sara Gill, New York, NY (US); Eric Hansen, Columbia, MO (US); Jill C. Hartley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 286 days.

(21) Appl. No.: 13/102,429

(22) Filed: May 6, 2011

(65) Prior Publication Data

US 2012/0226610 A1  Sep. 6, 2012

Related U.S. Application Data

(60) Provisional application No. 61/449,345, filed on Mar. 4, 2011.

(51) Int. Cl.
*G06Q 40/00* (2012.01)
*G06Q 20/32* (2012.01)
*G06Q 20/10* (2012.01)
*G06F 21/35* (2013.01)

(52) U.S. Cl.
CPC .......... *G06Q 20/322* (2013.01); *G06Q 20/1085* (2013.01); *G06F 21/35* (2013.01)

(58) Field of Classification Search
USPC .......................................................... 705/39
See application file for complete search history.

(56) References Cited

U.S. PATENT DOCUMENTS

| 7,992,778 B1* | 8/2011 | Ramachandran et al. ..... 235/379 |
| 2005/0108096 A1* | 5/2005 | Burger et al. .................... 705/14 |
| 2006/0206709 A1* | 9/2006 | Labrou et al. ................. 713/167 |
| 2011/0238573 A1 | 9/2011 | Varadarajan |

OTHER PUBLICATIONS

Anonymous; "Contactless ATM card Launched"; ATM & Debit News, Dec. 16, 2010.*
Dan Balaban, Spanish Bank Installs 'First' Contactless ATMs, pp. 1-3, Apr. 5, 2011, NFC Times.†
Frederick Lowe, Contactless ATMs may have sounded the death of knell for skimming, pp. 1-4, Apr. 20, 2011, ATM Marketplace.†
Trevor J. Murphy, Spain Introduces Contactless ATM, p. 1, Apr. 13, 2011, Fortress Paper, Ltd.†

\* cited by examiner
† cited by third party

*Primary Examiner* — Edward Chang
(74) *Attorney, Agent, or Firm* — Michael A. Springs; Moore & Van Allen PLLC; Nicholas C. Russell

(57) ABSTRACT

In general, apparatuses, methods and computer program products for receiving a contactless transmission from an external apparatus to an automated teller machine (ATM) are disclosed. An ATM machine is provided that has been equipped with a contactless interface for interacting with an external apparatus such as a debit/credit card, mobile device, and/or contactless transmission equipped stickers.

25 Claims, 8 Drawing Sheets

CONTACTLESS AUTOMATED TELLER MACHINE

CROSS-REFERENCE TO RELATED APPLICATIONS

This application claims priority to U.S. Provisional Patent Application Ser. No. 61/449,345, filed Mar. 4, 2011, entitled "Contactless Automated Teller Machine," the entirety of which is incorporated herein by reference.

BACKGROUND

In today's "digital age," more and more processes are becoming digital or automated. This is especially true in the financial industry. Over the years, primary methods for financial transactions have evolved from cash to checks to credit and debit cards. More recently, technology has become available that permits for "contactless" transactions. For instance, a contactless payment is a payment where a customer pays a purchase amount without handing a payment card or a payment device to a cashier at the point-of-sale (POS) and without swiping the magnetic stripe of a payment card through a payment terminal (also sometimes referred to as a POS terminal). Although physical contact between the payment device and the payment terminal may still occur in a contactless payment environment, physical contact between the payment device and the payment terminal is not necessary for transmission of the payment information from the payment device to the payment terminal.

However, to date, automated teller machines (ATMs) have remained "contact" terminals requiring swiping of a magnetic stripe of a payment card or similar function. The absence of contactless functionality with ATMs in the marketplace is largely due to security issues and the differences in data that must be transmitted and processed versus a typical POS payment terminal. Thus, a need presently exists for a product that permits a user to engage in a contactless transaction with an ATM.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing an automated teller machine, computer product, method, or a combination of the foregoing for receiving a contactless transmission. Particularly, embodiments of the present invention are directed to an ATM capable of receiving data from an external apparatus via a contactless interface.

In a first embodiment of the present invention, an ATM is provided. The ATM includes a user interface, a memory device, a communication interface and a processing device operatively coupled to the user interface, memory device, and communication device. The communication interface includes a contactless interface. The processing device is configured to execute computer-readable program code to receive a contactless transmission from an external apparatus.

In a specific embodiment, the communication interface is configured to initiate a debit account transaction.

In some specific embodiments, the external apparatus is a debit card. In other specific embodiments, the external apparatus is a credit card. In still further specific embodiments, the external apparatus is a mobile device.

In some embodiments, the external apparatus is a sticker. In such embodiments, the sticker may be affixed to an external apparatus such as a mobile device, a credit card, a debit card, etc. In some embodiments, the sticker may be configured for one-way communication. In further embodiments, the sticker may be configured for two-way communication.

In a specific embodiment, the contactless interface is a near field communication (NFC) interface.

Additionally, in some specific embodiments, the processing device may be further configured to execute computer-readable program code to authenticate a user upon receiving the contactless transmission. In some embodiments, the contactless transmission received comprises data that identifies a financial account associated with the external apparatus.

In a further aspect of the present invention, a method for transacting with an ATM is provided. The method includes receiving data from an external apparatus through a contactless interface operatively connected to a processing device within the ATM.

In some embodiments, the data received from the external apparatus initiates a debit account transaction.

In a specific embodiment of the method, the external apparatus is a debit card. In another specific embodiment of the method, the external apparatus is a credit card. In still a further specific embodiment of the method, the external apparatus is a mobile device.

In some embodiments of the method, the external apparatus is a sticker. In such embodiments, the sticker may be affixed to an external apparatus such as a mobile device, a credit card, a debit card, etc. In some embodiments of the method, the sticker may be configured for one-way communication. In further embodiments of the method, the sticker may be configured for two-way communication.

In a specific embodiment of the method, the contactless interface is a near field communication (NFC) interface.

Additionally, in some specific embodiments, the method may further include authenticating a user upon receiving the data. In some embodiments of the method, the contactless transmission received comprises data that identifies a financial account associated with the external apparatus.

In still a further aspect of the invention, an ATM as substantially described herein with reference to and as illustrated by the accompanying drawings is provided.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
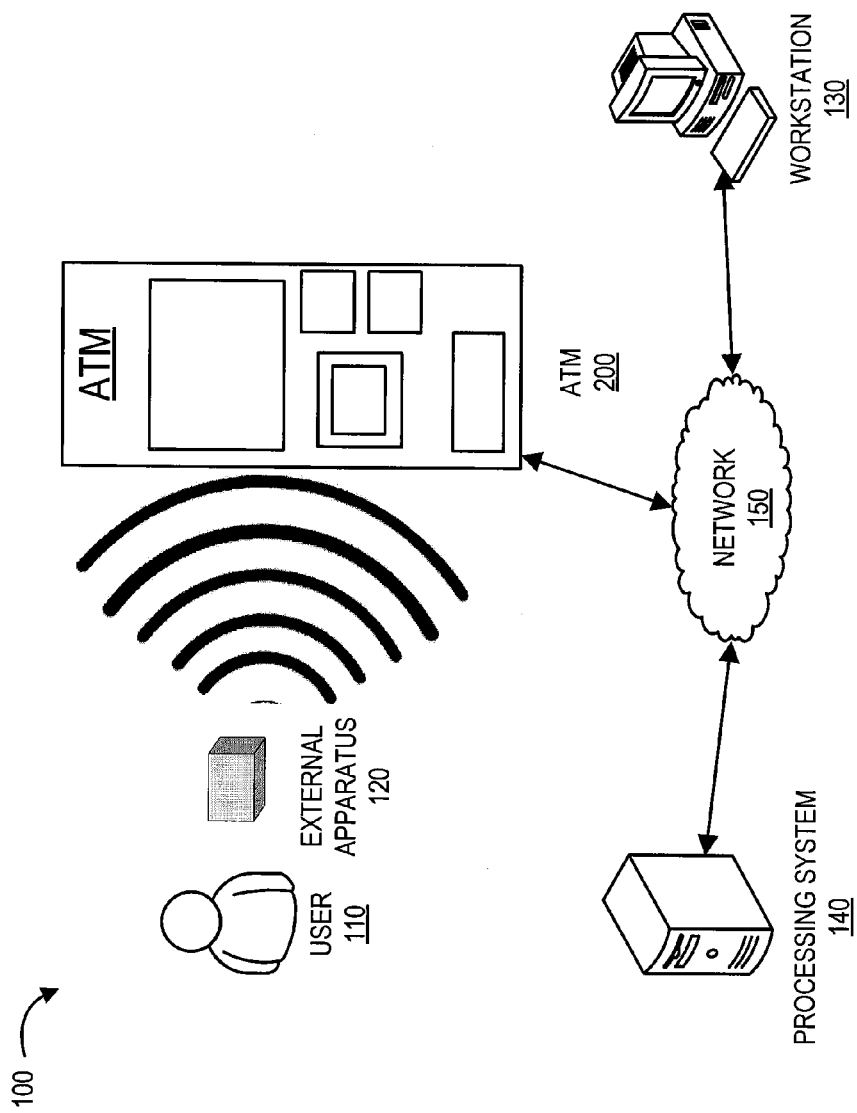
FIG. 1 illustrates a block diagram illustrating a contactless transaction environment, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "entity" may refer to a customer, seller, merchant, or the like. In accordance with embodiments of the invention, the term "user" may refer to a customer or the like, who utilizes an external apparatus capable of contactless ATM transactions. In accordance with embodiments of the invention, the term "tap" or "tapping" may refer to bringing an external apparatus close to or within the proximity of an ATM contactless interface so that information can be communicated wirelessly between the external apparatus and the ATM using short range wireless transmission technology, such near-field communication (NFC) technology, radio-frequency (RF) technology, or the like. Tapping may include physically tapping the external apparatus against an appropriate portion of the ATM or it may include only waving or holding the external apparatus near an appropriate portion of the payment terminal without making physical contact with the payment terminal.

In accordance with embodiments of the invention, the term "payment vehicle" may refer to an electronic payment vehicle, such as an electronic credit or debit card. The payment vehicle may not be a "card" at all and may instead be account identifying information stored electronically in a mobile device, such as in a cell phone. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user. In accordance with embodiments of the invention, the phrase "mobile wallet" refers to the hardware and/or software in a mobile device that enables the mobile device to be used to make contactless payments at a payment terminal.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In general, embodiments of the present invention relate to apparatuses, methods and computer program products for receiving a contactless transmission from an external apparatus to an ATM. An ATM machine is provided that has been equipped with a contactless interface for interacting with an external apparatus such as a debit/credit card, mobile device, and/or contactless transmission equipped stickers.

As a general matter, automated teller machine (ATM) users have not enjoyed the benefits of contactless transactions, while numerous point-of-sale (POS) contactless payment terminals have been made available. This unavailability of contactless ATMs is largely due to security issues (actual and perceived) as well as systematic problems relating to the type of data that must be wirelessly relayed to an ATM as opposed to a simple payment terminal. For instance, regarding security issues, in contrast to ATM transactions, POS contactless transactions do not require the entry of a personal identification number (PIN). Indeed, generally, there is no personal account verification at all with the POS contactless payment terminals (e.g. no signature required). As a result (of zero verification), contactless payments are generally limited as to the amount the transaction may be (e.g., generally $100 or less). As such, the POS contactless payment technology presently known is ineffective for use with an ATM. Indeed, financial institutions (and their customers) do not wish to institute contactless ATM terminals that do not utilize any security verification prior to providing access to financial funds and personal financial records.

Furthermore, regarding the type of data transmitted (or the way the data is processed), an ATM transaction is vastly different than a simple POS payment transaction. With POS transactions, the transaction is processed as a "credit" transaction where the information simply must be processed in order for making a payment through a major credit provider. Conversely, with ATM transactions, the transaction is generally a debit account transaction. As used herein, a "debit account transaction" refers to ATM transactions directly related to a financial institution account. For instance, a debit account transaction includes withdrawing funds, depositing funds, account balance inquiries, ordering related products such as checks, etc. Thus, not only must an ATM be capable of receiving the account information, it must also be capable of processing the information in a manner such that the actual financial institution account is identified such that information specific to that account can be displayed and debit account transactions performed on the particular account. Thus, the information processed and manner of processing in a debit account transaction is substantially different than a simple determination of whether the card is a valid major credit card.

In recognition of the above, generally, the present invention provides a system for contactless transmission of data from an external apparatus to an ATM. Upon tapping the external apparatus at the ATM, the ATM is configured to process the data received (i.e. account information, for example, account number, name, expiration date, debit/credit, etc.) and require further security authorization in order to access the desired financial account at the ATM. Generally speaking, the further security authorization will require at least the input of the proper PIN associated with the account.

Referring to FIG. 1, a block diagram illustrating a contactless transaction environment 100 configured for initiating a contactless transaction via an external apparatus 120 is shown. As illustrated, the contactless transaction environment 100 may include an external apparatus 120 operated by a user 110 who may be a customer who wants to make an ATM 200 transaction.

The contactless transaction environment 100 may also include a workstation 130 and a processing system 140 that are in electronic communication with the contactless apparatus 120 via a network 150, which may be the Internet, an intranet or the like.

In FIG. 1, the network 150 may include a local area network (LAN), a wide area network (WAN), and/or a global area network (GAN). The network 150 may provide for wireline, wireless, or a combination of wireline and wireless communication between devices in the network. In some embodiments, the network 150 includes the Internet. In some embodiments, the network 150 may include a wireless telephone network.

As illustrated in FIG. 1, an ATM 200 may be connected to a workstation 130 via the network 150. The workstation 130 may be used by a third party/entity to interact with the ATM 200. The workstation 130 may include various features, such as a network communication interface, a processing device, a user interface, and a memory device.

As used with respect to the workstation 130, a "communication interface" may generally include a modem, server, transceiver, and/or other device for communicating with other devices on a network. The network communication interface may be a communication interface having one or more communication devices configured to communicate with one or more other devices on the network 150, such as the contactless apparatus 130, the processing system 140, other processing systems, data systems, etc.

Additionally, referring to the workstation 130, a "processing device" may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network 150.

Furthermore, a "user interface" within the workstation 130 may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 110 or output data to the user 110. These input and output devices may include a display, mouse, keyboard, button, touchpad, touch screen, microphone, speaker, light, joystick, switch, and/or other customer input/output device for communicating with one or more customers.

A "memory device" within the workstation 130 may generally refer to a device or combination of devices that store one or more forms of computer-readable media for storing data and/or computer-executable program code/instructions. For example, the memory device may include any computer memory that provides an actual or virtual space to temporarily or permanently store data and/or commands provided to the processing device when it carries out its functions described herein.

Figure 2:
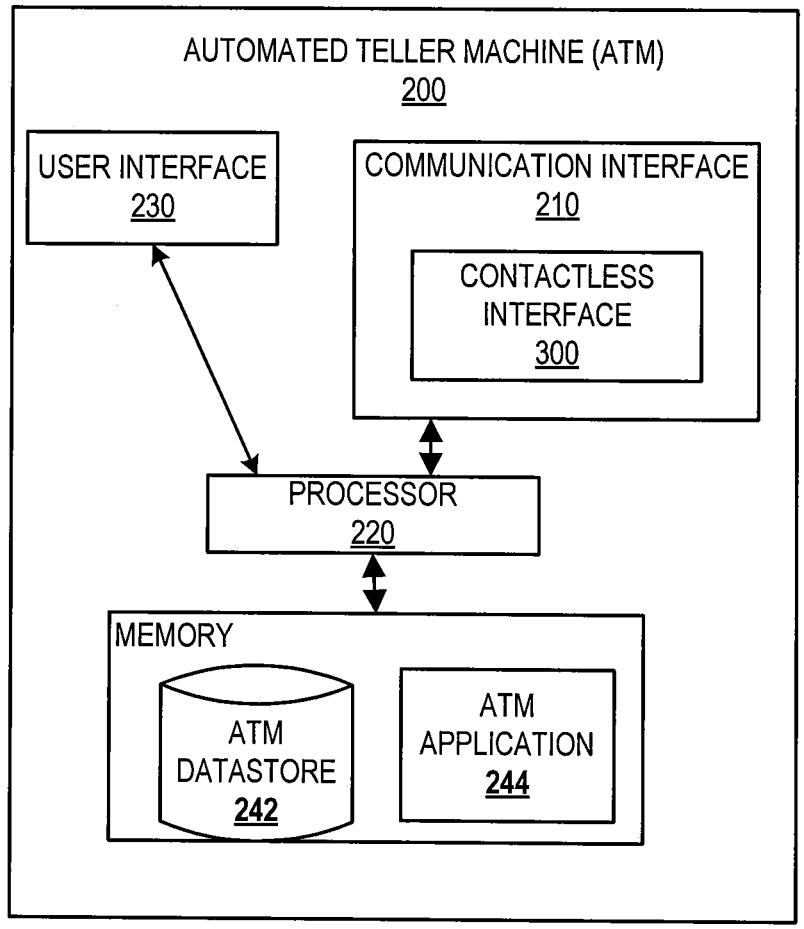
FIG. 2 illustrates a block diagram illustrating an ATM, in accordance with an embodiment of the invention.

Referring now to FIG. 2, the ATM 200 includes a communication interface 210, a processor 220, a user interface 230, and a memory 240 having an ATM datastore 242 and an ATM application 244 stored therein. As shown, the processor 220 is operatively connected to the communication interface 210, the user interface 230, and the memory 240.

The communication interface 210 of the ATM may include a contactless interface 300. In one embodiment, the contactless interface is an NFC interface. The contactless interface 300 is configured to contactlessly and/or wirelessly send and/or receive information over relatively short ranges (e.g., within four inches, within three feet, etc.). The contactless interface 300 may include a transmitter, receiver, smart card, key card, proximity card, radio frequency identification (RFID) tag and/or reader, and/or the like. In some embodiments, the contactless interface 300 communicates information via radio, IR, and/or optical transmissions. Generally, the contactless interface 300 is configured to operate as a contactless transmitter and/or as a contactless receiver. The contactless interface 300 functions to enable transactions with users utilizing an external apparatus capable of contactless communication. Also, it will be understood that the contactless interface 300 may be embedded, built, carried, and/or otherwise supported in and/or on the ATM 200. In some embodiments, the contactless interface 300 is not supported in and/or on the ATM 200, but the contactless interface 300 is otherwise operatively connected to the ATM 200 (e.g., where the contactless interface 300 is a peripheral device plugged into the ATM 200, etc.). The contactless interface 300 of the ATM 200 is configured to contactlessly and/or wirelessly communicate information to and/or from an external apparatus 120.

The communication interface 210 may generally also include a modem, server, transceiver, and/or other device for communicating with other devices and systems on a network.

The user interface 230 of the ATM 200 may include a display (e.g., a liquid crystal display, a touchscreen display, and/or the like) which is operatively coupled to the processor 220. The user interface 230 may include any number of other devices allowing the ATM 200 to transmit/receive data to/from a user, such as a keypad, keyboard, touch-screen, touchpad, microphone, mouse, joystick, other pointer device, button, soft key, and/or other input device(s).

As further illustrated in FIG. 2, the memory 240 may include ATM applications 244. It will be understood that the ATM applications 244 can be executable to initiate, perform, complete, and/or facilitate one or more portions of any embodiment described and/or contemplated herein. Generally, the ATM application 244 is executable to receive transaction instructions from the user and perform typical ATM functions, as appreciated by those skilled in the art. In some embodiments of the invention, the ATM application is configured to access content, such as data stored in memory 240, for example in the ATM datastore 242, or a database in communication with the ATM 200 and may transfer the content to the external apparatus 120 if the external apparatus 120 is configured for contactless communication. The content may include coupons, ads, offers, images, financial receipts, account-related documentation, reissued account card, new account card, prepaid cards, or the like.

Of course, the ATM 200 may require users to identify and/or authenticate themselves to the ATM 200 before the ATM 200 will initiate, perform, complete, and/or facilitate a transaction. For example, in some embodiments, the ATM 200 is configured (and/or the ATM application 244 is executable) to authenticate an ATM user based at least partially on an ATM debit card, smart card, token (e.g., USB token, etc.), username, password, PIN, biometric information, and/or one or more other credentials that the user presents to the ATM 200. Additionally or alternatively, in some embodiments, the ATM 200 is configured to authenticate a user by using one-, two-, or multi-factor authentication. For example, in some embodiments, the ATM 200 requires two-factor authentication, such that the user must provide a valid debit card and enter the correct PIN associated with the debit card in order to authenticate the user to the ATM 200. However, in some embodiments, the user may access the ATM 200 and view or receive content that may be transferred to/from the ATM 200.

Figure 3:
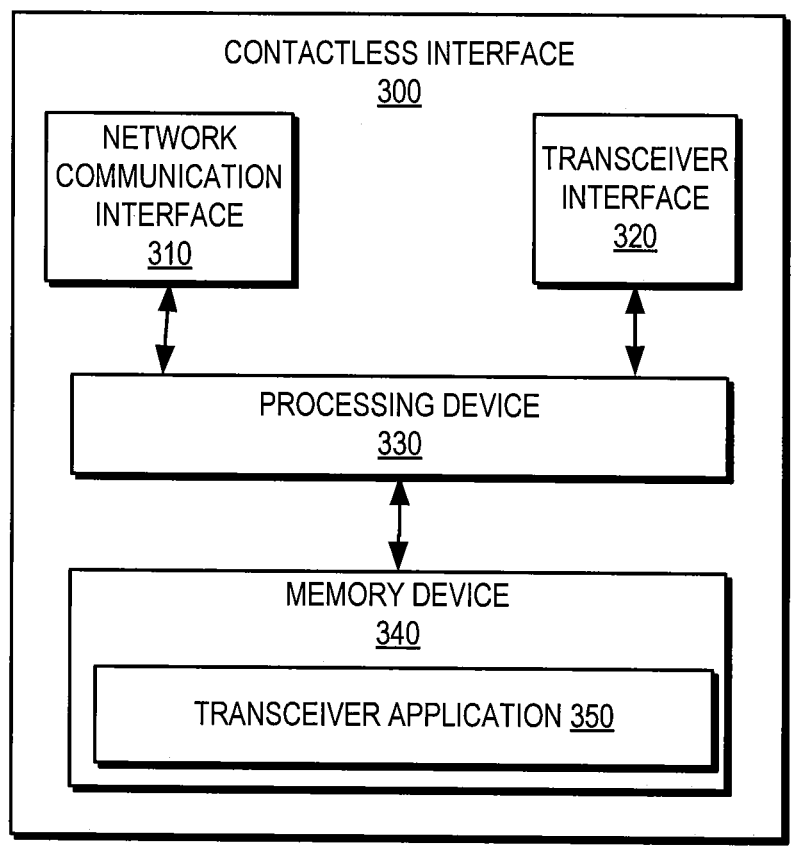
FIG. 3 illustrates a block diagram illustrating a contactless interface, in accordance with an embodiment of the invention.

Referring now to FIG. 3, one embodiment of the contactless interface 300 is illustrated. The contactless interface 300 may include various features, such as a network communication interface 310, a processing device 330, a transceiver interface 320 (or just a receiver if only intended for one-way communication), and a memory device 340 that may include a transceiver application 350.

As used with respect to the contactless interface 300, a "communication interface" may generally include a modem, server, transceiver, and/or other device for communicating with other devices on a network. The network communication interface 310 may be a communication interface having one or more communication devices configured to communicate with one or more other devices in the contactless transaction environment 100, such as the external apparatus 120, the workstation 130, the processing system 140, other processing systems, data systems, etc.

In one embodiment, the transceiver interface 320 is a separate module that may generally include a transceiver, i.e., one or more antennas and and/or other electronic circuitry, devices, and software, for receiving electronic payment vehicle data when the external apparatus 120 is held close to or tapped at the contactless interface 300 of the ATM 200. In some embodiments, the transceiver interface 320 is part of the network communication interface 310. Furthermore, the transceiver interface 320 may also be used as an interface to send content to the external apparatus 120 when the external apparatus 120 is held close to or tapped at the contactless interface 300.

An output device for the transceiver interface 320 may include a display that provides instructions regarding the steps for making a contactless transaction. In some embodiments where the ATM 200 requests the user's signature (if needed), the display may also serve as a touchpad input device to input the user's signature via a stylus. Other output devices may include one or more LEDs or an audio speaker, both which may indicate to the user that data has been successfully received from the external apparatus 120. A printer that can print paper receipts may also be incorporated into the ATM 200. However, in one embodiment, receipts are electronically transferred to the external apparatus 120. Other embodiments of the contactless interface 300 may carry other input and output devices, such as a mouse, keyboard, button, touchpad, touch screen, microphone, speaker, light, joystick, switch, or the like.

As used with respect to the contactless interface 300, a "processing device," 330 may generally refer to a device or combination of devices having circuitry used for implementing the communication and/or logic functions of a particular system. For example, a processing device 330 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 330 may be configured to use the network communication interface 310 and/or the transceiver interface 320 to transmit and/or receive data and/or commands to and/or from the other devices that are communicating in the contactless payment environment 100.

As used with respect to the contactless interface 300, a "memory device" 340 may generally refer to a device or combination of devices that store one or more forms of computer-readable media for storing data and/or computer-executable program code/instructions. For example, in one embodiment, the memory device 340 may include any computer memory that provides an actual or virtual space to temporarily or permanently store data and/or commands provided to the processing device 330 when it carries out its functions described herein. In one embodiment, the memory device 340 stores a transceiver application 350. The transceiver application 350 may work in conjunction with the previously described transceiver interface 320 to receive electronic payment vehicle data when the external apparatus 120 is held close to or tapped at the contactless interface 300. In some particular embodiments, the transceiver application 350 may also be configured to send data to the external apparatus 120 when the external apparatus 120 is held close to or tapped at the ATM 200. The transceiver application 350 may also potentially provide a power source to the external apparatus, in the event the primary power source is depleted (or a completely passive chip or module is utilized in the external apparatus 120 to yield contactless functionality), in order to power the external apparatus 120 to initiate the transaction.

Figure 4A:
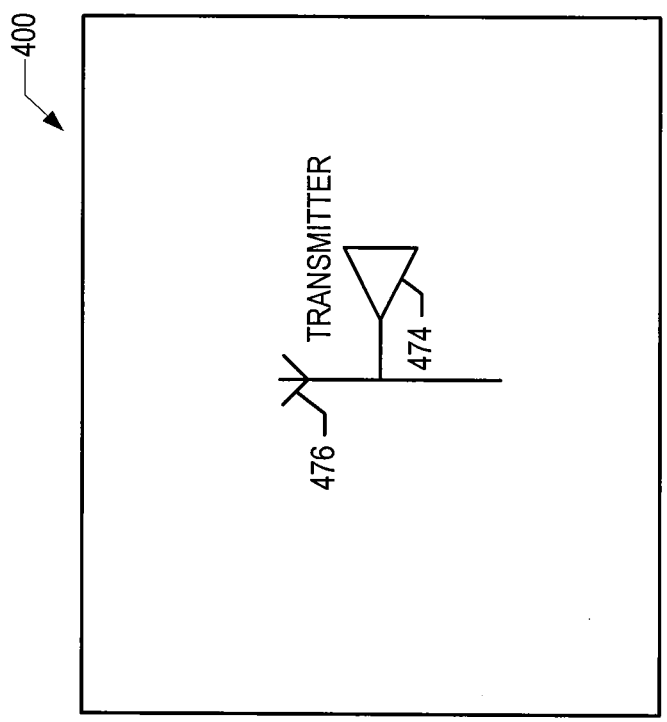
FIG. 4A illustrates a block diagram illustrating an external apparatus such as a debit/credit card or a sticker equipped for one-way data transmission to the ATM
Figure 4B:
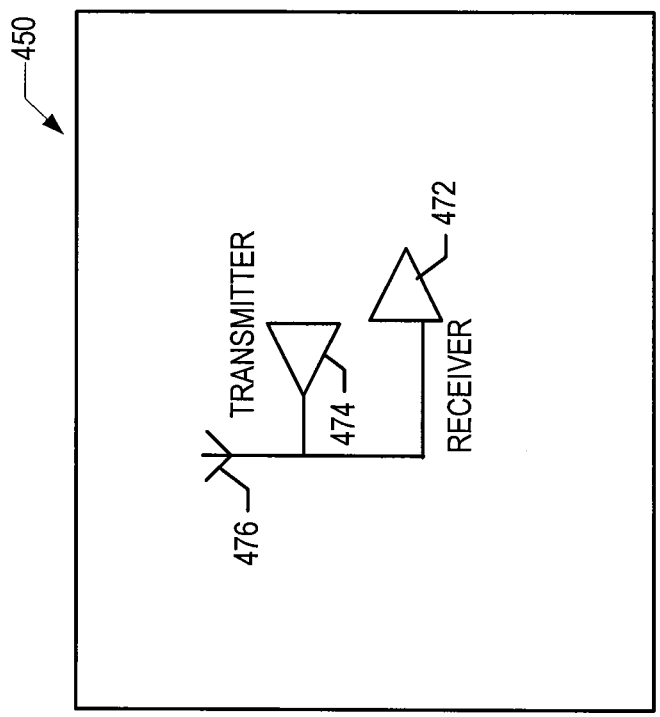
FIG. 4B illustrates a block diagram illustrating an external apparatus such as a debit/credit card or a sticker that is equipped for two-way data transmission to and from the ATM.

Referring to FIGS. 4A and 4B, an external apparatus 400 is illustrated. Generally speaking, the external apparatus 400 may be anything that includes a chip or module capable of wireless transmission of the required data for contactless transactions. However, the most common external apparatus 400 is a physical credit or debit card. Also "stickers" have emerged somewhat recently. Such stickers include the chip or module and may be placed on anything convenient. Generally, such stickers are to be placed on an otherwise non-contactless functioning physical credit or debit card or possibly a mobile device such as a mobile phone. FIGS. 4A and 4B are intended to encompass physical credit/debit cards and stickers. Of note, the size of the credit/debit card is not limited to the size of conventional credit/debit cards. Indeed, the credit/debit card may be substantially smaller (such as a keychain card) than conventional cards. Further, the credit/debit card may not be a "card" at all, but rather a fob or some other type of token.

FIG. 4A illustrates a credit/debit card or sticker 400 that is configured for one-way transmission. The card/sticker 400 illustrated in FIG. 4A does not include a data receiving means. As such, the card/sticker is only capable of one-way transmission of data from the card/sticker to the ATM 200. Generally speaking, such card/sticker functionality is by way of a passive routine, i.e., the chip or module that transmits the information does not include a separate source of power. Rather, the ATM 200 (and specifically, the contactless interface 300), or some other external power source, may provide the power to initiate the transmission by, for instance, producing an external electromagnetic field that provides the power to allow the card/sticker transmitting antenna 476 to initiate a transmission from the transmitter 474, via radio frequency electromagnetic waves. Of note, FIG. 4A illustrates an embodiment that is generally a passive routine. However, if desired, a dedicated power source could be provided in order to utilize an active routine, as will be appreciated by those skilled in the art.

FIG. 4B illustrates a card/sticker 450 that is configured for two-way transmission. The card/sticker 450 illustrated in FIG. 4B includes a transmitter 474 and a receiver 472 for transmitting and receiving data respectively. Generally speaking, two-way communicating device functionality is achieved by an active routine where a separate power source (not illustrated) is also included. However, if desired, a two-way communicating card/sticker could be configured to utilize a passive routine.

Two-way communication cards/stickers, i.e. "smart" cards/stickers, enable information to be transferred in real-time between the card/sticker and other sources (including ATM 200) without the use of a carrier network or Wi-Fi access. Such "smart" cards/stickers are beneficial as they offer a plurality of desirable options, such as the ability to remotely deactivate lost or stolen cards/stickers.

Figure 5:
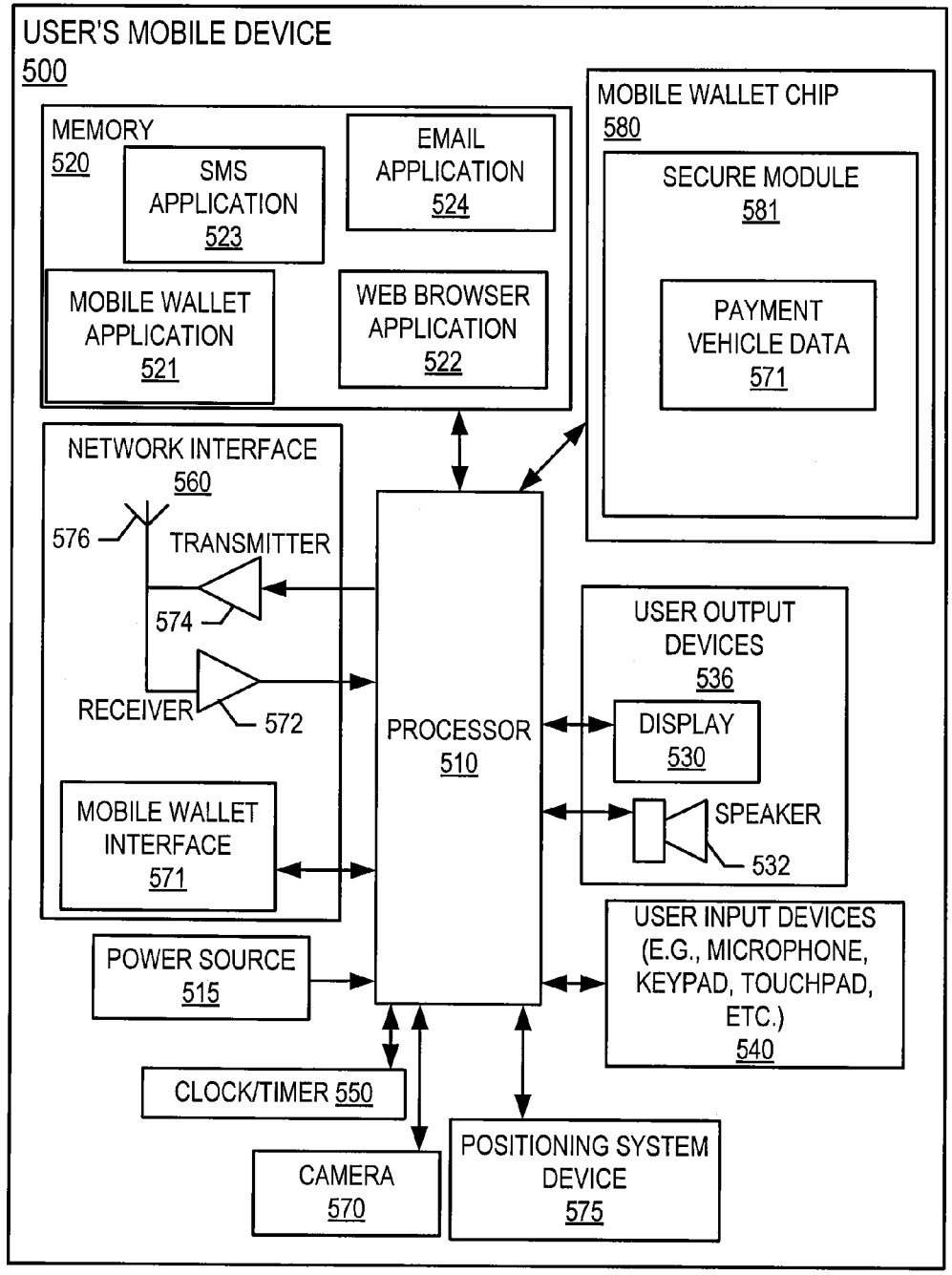
FIG. 5 illustrates a block diagram illustrating a mobile device, in accordance with an embodiment of the invention.

Turning now to FIG. 5, illustrated is an embodiment of a mobile device 500 that may be configured to make a contactless transaction at the ATM 200. A "mobile device" 500 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 500 may generally include a processor 510 communicably coupled to such devices as a memory 520, user output devices 536, user input devices 540, a network interface 560, a power source 515, a clock or other timer 550, a camera 570, a positioning system device 575, one or more mobile wallet chips/memory 580, etc. The processor 510, and other processors described herein, may generally include circuitry for implementing communication and/or logic functions of the mobile device 500. For example, the processor 510 may include a digital signal processor device, a microprocessor device, and various analog to digital converters, digital to analog converters, and/or other support circuits. Control and signal processing functions of the mobile device 500 may be allocated between these devices according to their respective capabilities. The processor 510 thus may also include the functionality to encode and interleave messages and data prior to modulation and transmission. The processor 510 may additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the mobile device 500 to transmit and receive web content, such as, for example, location-based content and/or other web page content, according to a Wireless Application Protocol (WAP), Hypertext Transfer Protocol (HTTP), and/or the like.

The processor 510 may also be capable of operating a client application, such as a mobile wallet application 521. The mobile wallet application 521 may be downloaded from a server and stored in the memory 520 of the mobile device 500. Alternatively, the mobile wallet application 521 may be pre-installed and stored in a memory in the mobile wallet chip 580. In such an embodiment, the user may not need to download the mobile wallet application 521 from a server. In some embodiments, the mobile wallet application 521 may have a graphical user interface (GUI) that allows the user to perform various transactional processes. The GUI may also allow the user to set certain payment preferences or mobile wallet preferences.

The mobile wallet chip 580 includes a secure module 581 that may contain the payment vehicle data 571. The mobile wallet chip/memory 580 may be an integrated circuit, a microprocessor, a system-on-a-chip, a microcontroller, or the like. In one embodiment, the mobile wallet chip/memory 580 provides Near Field Communication (NFC) capabilities to the device 500.

Of note, while FIG. 5 illustrates the mobile wallet chip 580 as a separate and distinct element within the mobile device 500, it will be apparent to those skilled in the art that the mobile wallet chip 580 functionality may be incorporated within other elements in the mobile device 500 or provided as a sticker affixed to the mobile device 500 as discussed above. For instance, the functionality of the mobile wallet chip 580 may be incorporated within the mobile device memory 520. In a particular embodiment, the functionality of the mobile wallet chip 580 is incorporated in an element within the mobile device 500 that provides NFC capabilities to the mobile device 500. However, it is not necessary for the mobile wallet chip 580 to provide the NFC capabilities to the mobile device 500. The mobile device 500 may include a NFC providing element (and/or other wireless communication systems) (not shown) separate from the mobile wallet chip 580.

The secure module 581 may be a memory device within the mobile wallet chip 580. The secure module 581 may comprise payment vehicle data 571 associated with a plurality of payment vehicles. The payment vehicle data 571 may be data typical of standard card-type payment vehicles. For instance, payment vehicle data 571 for each payment vehicle that is stored in the secure module 581 may include the payment vehicle type, the payment vehicle number, the name associated with the payment vehicle, the expiration date of the payment vehicle, the security code associated with the payment vehicle, whether the payment vehicle is a credit or debit payment vehicle, gift card payment vehicle, etc. Additionally, the secure module 581 may include data indicating whether a payment vehicle is a default payment vehicle.

In the embodiment depicted in FIG. 5, since the secure module 581 is stored in a memory in the mobile wallet chip 580 and not in a memory 520 in the mobile device 500, the user may be able to transfer the mobile wallet chip 580, if the mobile wallet chip 580 is not irreversibly integrated into the mobile device 500, to another mobile device and the user may consequently have access to the payment vehicles in the mobile wallet chip 580 on a different mobile device. Alternatively, the secure module 581 could be stored in a secured sector of memory 520 or other data storage of the mobile device 500 and be transferred to a new mobile device 500. Furthermore, the mobile wallet application 500 and/or data within the secure modules may be additionally stored on an external apparatus or network to provide the user with the capability to readily transfer their mobile wallet system from one mobile device 500 to another or to restore their mobile wallet system to their device 500, if needed.

The processor 510 may be configured to use the network interface 560 to communicate with one or more other devices on the network 150. In this regard, the network interface 560 may include an antenna 576 operatively coupled to a transmitter 574 and a receiver 572 (together a "transceiver"). The processor 510 may be configured to provide signals to and receive signals from the transmitter 574 and receiver 572, respectively. These signals may include radio frequency signals emanating from the mobile device's transmitter 574 when the mobile device is tapped at or held or waved in close proximity to the ATM 200. These signals may also include radio frequency signals received at the mobile device's receiver 572 when the mobile device is tapped at or held or waved in close proximity to the contactless apparatus 120. In one embodiment, these radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 574 and receiver 572 at the mobile device may transmit and receive radio frequency signals, respectively, from a payment terminal within a distance of up to approximately 25 cm, and preferably from 0-20 cm, such as from 0-15 cm, and 0-10 cm.

As indicated earlier, the processor 510 may be configured to provide signals to and receive signals from the transmitter 574 and receiver 572, respectively. The signals may also include signaling information in accordance with the air interface standard of the applicable cellular system of the wireless telephone network that may be part of the network 150. In this regard, the mobile device 500 may be configured to operate with one or more air interface standards, communication protocols, modulation types, and access types. By way of illustration, the mobile device 500 may be configured to operate in accordance with any of a number of first, second, third, and/or fourth-generation communication protocols and/or the like. For example, the mobile device 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 500 may also be configured to operate in accordance with non-cellular communication mechanisms, such as via a wireless local area network (WLAN) or other communication/data networks.

The network interface 560 may also include a mobile wallet interface 571 in order to allow a user to execute some or all of the above-described processes with respect to the mobile wallet application 521 and the secure module 581 of the mobile wallet chip 580. The mobile wallet interface 571 may have access to the hardware, e.g., the transceiver, and software previously described with respect to the network interface 560.

The mobile device 500 may comprise a transceiver that works in conjunction with the secure module 581 of the mobile device 500. In one embodiment, the antenna and other hardware or software that transmit payment vehicle data from the secure module 581 of the mobile device 500 may be integrated into the secure module 581.

As described above, the mobile device 500 may have a user interface that includes user output devices 536 and/or user input devices 540. The user output devices 536 may include a display 530 (e.g., a liquid crystal display (LCD) or the like) and a speaker 532 or other audio device, which are operatively coupled to the processor 510. The user input devices 540, which may allow the mobile device 500 to receive data from a user 110, may include any of a number of devices allowing the mobile device 500 to receive data from a user, such as a keypad, keyboard, touch-screen, touchpad, microphone, mouse, joystick, other pointer device, button, soft key, and/or other input device(s).

The mobile device 500 may further include a power source 515. Generally, the power source 515 is a device that supplies electrical energy to an electrical load. In one embodiment, power source 515 may convert a form of energy such as solar energy, chemical energy, mechanical energy, etc. to electrical energy. Generally, the power source 515 in a mobile device 500 may be a battery, such as a lithium battery, a nickel-metal hydride battery, or the like, that is used for powering various circuits, e.g., the transceiver circuit, and other devices that are used to operate the mobile device 500. Alternatively, the power source 515 may be a power adapter that can connect a power supply from a power outlet to the mobile device 500. In such embodiments, a power adapter may be classified as a power source "in" the mobile device.

The mobile device 500 may also include a memory 520 operatively coupled to the processor 510. As used herein, memory may include any computer readable medium configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory may additionally or alternatively include an electrically erasable programmable read-only memory (EEPROM), flash memory or the like.

The memory 520 may store any of a number of applications or programs which comprise computer-executable instructions/code executed by the processor 510 to implement the functions of the mobile device 500 described herein. For example, the memory 520 may include such applications as a web browser application 522 and a mobile wallet application 521. The mobile wallet application 521 may be capable of performing one or more functions described above. These applications may also typically provide a graphical user interface (GUI) on the display 530. For instance, as described previously, the GUI for the mobile wallet application 521 may allow the user 110 to enter input to select a payment vehicle or to transmit to a contactless apparatus 120 or otherwise transact with the contactless apparatus 120.

The memory 520 may also store any of a number of pieces of information, and data, used by the mobile device 500 and the applications and devices that make up the mobile device 500 or are in communication with the mobile device 500 to implement the functions of the mobile device 500 and/or the other systems described herein. For example, the memory 520 may include such data as user authentication information to gain access to the mobile wallet application 521, user authentication information for each payment vehicle that is stored by or accessible via the mobile wallet application 521, user authentication information to access the secure module 581 of the mobile wallet chip 580, etc. In other embodiments, this authentication information may be stored in a memory of the mobile wallet chip 580.

Figure 6:
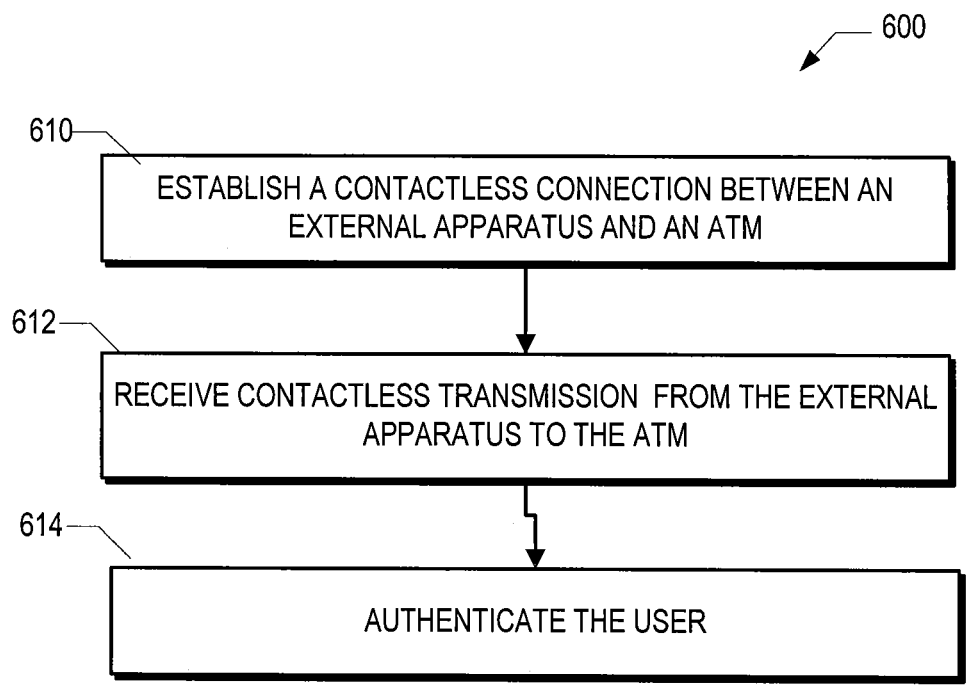
FIG. 6 is a flow diagram of a method for receiving a contactless transmission from the external apparatus to the ATM.

Referring now to FIG. 6, illustrated is a high level flow diagram of a method 600 for receiving a contactless transmission from an external apparatus 120. At block 610, a contactless connection between the external apparatus 120 and an ATM 200 is established. In one embodiment, the external apparatus 120 is a debit/credit card. In particular embodiments the contactless connection is an NFC connection. Upon establishing the contactless connection, the user may be required to provide authentication.

After the contactless connection is established, the method moves to block 612 where the contactless transmission is received from the external apparatus 120 to the ATM 200. As noted above, typical content to be transferred from the external apparatus 120 includes data identifying the financial account associated with the external apparatus.

Finally, moving to block 614, the ATM 200 authenticates the user. This may be accomplished by any of the means noted above, but generally will include entering a Personal Identification Number (PIN) after the ATM 200 has received the transmitted data.

Figure 7:
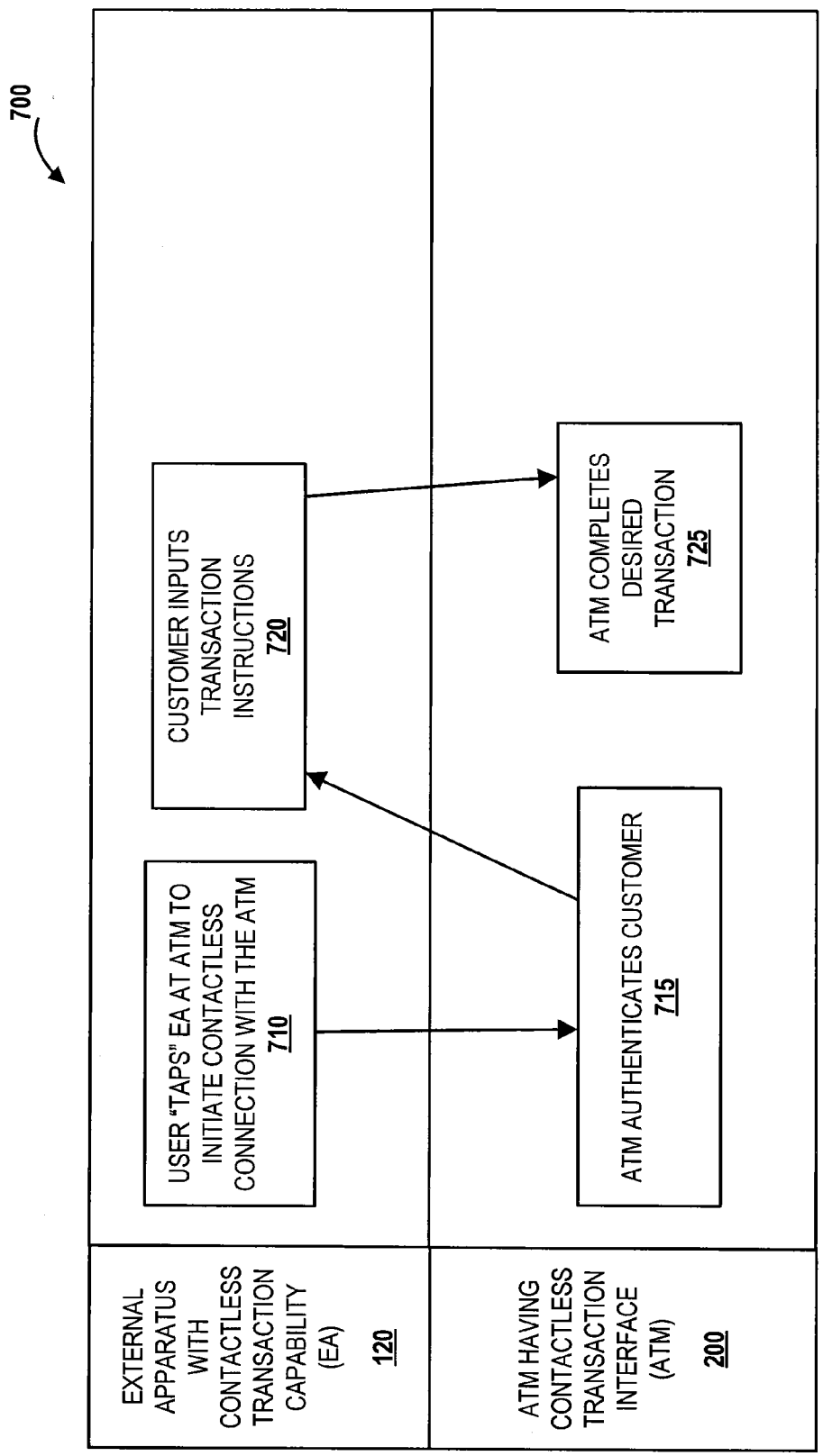
FIG. 7 is a mixed block and flow diagram of a method for contactless transmission from an external apparatus to an ATM, in accordance with an embodiment of the invention.

FIG. 7 illustrates a mixed block and flow diagram of a system 700 for engaging in a contactless transaction between an ATM 200 and an external apparatus 120, in accordance with an embodiment of the present invention. It will be understood that the system 700 illustrated is an example embodiment. As shown, the system 700 includes an external apparatus 120 having a contactless transaction interface and an ATM 200 having a contactless transaction interface.

In this example embodiment, the external apparatus 120 is operatively connected to the ATM 200 via the contactless interface of the ATM 200. In addition, the external apparatus and/or the ATM 200 may be operatively connected to one or more networks, servers, etc. The ATM 200 is maintained by the financial institution and the external device is preferably, but not necessarily, maintained by a customer of the financial institution.

As represented by block 710, the customer taps the external apparatus 120 at the ATM 200 to initiate a contactless connection with the ATM. For example, the customer may "tap" the external apparatus 120 by positioning the external apparatus 120 within close proximity of the contactless interface of the ATM 200, such that a connection is established. In one embodiment, the contactless connection is an NFC connection.

Block 715 represents the ATM 200 authenticating the customer. Authentication may be by any typical means as understood by those skilled in the art, but generally requires the customer to enter a PIN associated with the account the customer wishes to authenticate himself to the ATM 200. Of note, while FIG. 7 illustrates the contactless connection being established prior to ATM 200 authentication, the customer may first authenticate himself prior to the contactless connection being established. For instance, the customer may input authentication information on his external apparatus 120 and such transfer such data to the ATM 200 upon establishing the contactless connection. Alternatively, the customer may authenticate, for instance, by swiping a debit card associated with the account and entering a PIN at the ATM 200 prior to establishing the contactless connection. Furthermore, ATM authentication may not be required for certain transactions. For instance, ATM authentication may not be necessary for transactions that do not involve customer- or account-specific information. In one embodiment, the customer may initiate a contactless connection with the ATM 200 to retrieve non-private content available to the customer, such as marketing materials, promotional materials, etc.

At block 720, the customer inputs instructions to the ATM 200 to execute the desired transaction. Of course, the desired transaction may be any type of ATM transaction such as, for example, withdrawing funds, depositing funds, transferring funds, balance checks, ordering products such as checks, and the like. Block 725 represents the ATM 200 completing the customer's desired transaction.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A contactless automated teller machine (ATM) comprising:
    at least one user interface;
    at least one memory device;
    at least one communication interface comprising a contactless interface; and
    at least one processing device operatively coupled to the user interface, the at least one memory device, and the at least one communication interface, wherein the at least one processing device comprises circuitry specific to an automated teller machine (ATM) and is configured to execute computer-readable program code to:
        identify a communication sticker associated with a user, wherein the communication sticker is affixed to an external apparatus associated with the user;
        establish a connection between the contactless ATM and the external apparatus, wherein the connection is established without contact, wherein the connection allows for real-time information transferring without the use of a carrier network associated with the external apparatus or ATM and, wherein the external apparatus is a mobile device;
        receive a contactless transmission directly from the communication sticker affixed to the external apparatus comprising authentication information, wherein the user associated with the external apparatus inputted the authentication information into the external apparatus prior to transmission;
        authenticate the user associated with the external apparatus with a two-factor authentication, wherein the authentication is based on the authentication information that was inputted into the external apparatus by the user and directly transmitted to the contactless ATM by the communication sticker affixed to the external apparatus and an identification of the external apparatus as associated with the user, based on a recognition of the communication sticker affixed to the external apparatus;
        create a secure two-way communication between the contactless ATM and the external apparatus, wherein the two-way communication is a communication between the contactless ATM and the communication sticker affixed to the external apparatus, wherein the communication sticker affixed to the external apparatus provides the communication to the external apparatus;
        receive financial transaction instructions from an authenticated user associated with the external apparatus via the secure connection between the contactless ATM and the communication sticker affixed to the external apparatus, wherein financial transactions include withdrawing, depositing, or transferring funds and ordering financial institution products; and
        send information associated with the financial transaction instructions from the contactless ATM to the authenticated user via the external apparatus using the secure connection between the contactless ATM and the communication sticker affixed to the external apparatus.

2. The contactless ATM of claim 1, wherein the communication interface is configured to initiate a debit account transaction.

3. The contactless ATM of claim 1, wherein the contactless interface is a near field communication (NFC) interface.

4. The contactless ATM of claim 1, wherein the processing device is further configured to execute computer-readable program code to authenticate a user upon receiving the contactless transmission.

5. The contactless ATM of claim 1, wherein the contactless transmission received further comprises data that identifies a financial account associated with the external apparatus.

6. A method for transacting with a contactless automated teller machine (ATM) comprising:
    identifying, via a computing device processor, a communication sticker associated with a user, wherein the communication sticker is affixed to an external apparatus associated with the user;
    establish a connection between the contactless ATM and the external apparatus, wherein the connection is established without contact, wherein the connection allows for real-time information transferring without the use of a carrier network associated with the external apparatus or ATM and, wherein the external apparatus is a mobile device;
    receiving, at the contactless ATM, data comprising authentication information directly from the communication sticker affixed to the external apparatus through the contactless connection, wherein the user associated with the external apparatus inputted the authentication information into the external apparatus prior to receipt at the contactless ATM;
    authenticating, via a computer device processor, the user associated with the external apparatus with a two-factor authentication, wherein the authentication is based on the authentication information that was inputted into the external apparatus by the user and directly transmitted to the contactless ATM by the communication sticker affixed to the external apparatus and an identification of the external apparatus as associated with the user, based on a recognition of the communication sticker affixed to the external apparatus;
    creating, via a computer device processor, a two-way communication between the contactless ATM and the external apparatus, wherein the two-way communication is a communication between the contactless ATM and the communication sticker affixed to the external apparatus, wherein the communication sticker affixed to the external apparatus provides the communication to the external apparatus;
    receive financial transaction instructions from an authenticated user associated with the external apparatus via the connection between the contactless ATM and the communication sticker affixed to the external apparatus, wherein financial transactions include withdrawing, depositing, or transferring funds and ordering financial institution products; and
    send financial transaction instructions from the contactless ATM to the authenticated user via the external apparatus using the connection between the contactless ATM and the communication sticker affixed to the external apparatus.

7. The method of claim 6, wherein the data comprising authentication information received from the external apparatus initiates a debit account transaction.

8. The method of claim 6, wherein the contactless interface is a near field communication (NFC) interface.

9. The method of claim 6, further comprising authenticating a user upon receiving the data.

10. The method of claim 6, wherein the data further comprises information that identifies a financial account associated with the external apparatus.

11. The contactless ATM of claim 1, wherein the processing device is further configured to transmit content to the external apparatus.

12. The contactless ATM of claim 11, wherein the content is a coupon.

13. The contactless ATM of claim 11, wherein the content is a receipt associated with the financial transaction instructions.

14. The contactless ATM of claim 1, wherein the financial transaction instructions from the authenticated user comprise instructions indicating what type of financial transaction the authenticated user wants to conduct at the contactless ATM.

15. The method of claim 6, further comprising transmitting content from the contactless ATM to the external apparatus.

16. The method of claim 15, wherein transmitting content from the contactless ATM to the external apparatus comprises transmitting a coupon.

17. The method of claim 15, wherein transmitting content from the contactless ATM to the external apparatus comprises transmitting a receipt associated with the financial transaction instructions.

18. The method of claim 6, wherein receiving financial transaction instructions from the authenticated user comprises receiving instructions indicating what type of financial transaction the authenticated user wants to conduct at the contactless ATM.

19. A computer program product for transacting with a contactless automated teller machine (ATM), the computer program product comprising a non-transitory computer-readable medium, wherein the non-transitory computer-readable medium comprises computer executable program code store therein, the computer executable program code comprises:
    a first executable portion configured to identify a communication sticker associated with a user, wherein the communication sticker is affixed to an external apparatus associated with the user;
    a second executable portion configured to establish a connection between the contactless ATM and the external apparatus, wherein the connection is established without contact, wherein the connection allows for real-time information transferring without the use of a carrier network associated with the external apparatus or ATM and, wherein the external apparatus is a mobile device;
    a third executable portion configured to receive data comprising authentication information directly from the communication sticker affixed to the external apparatus through the contactless connection, wherein the user associated with the external apparatus inputted the authentication information into the external apparatus prior to receipt at the contactless ATM;
    a fourth executable portion configured to authenticate the user associated with the external apparatus with a two-factor authentication, wherein the authentication is based on the authentication information that was inputted into the external apparatus by the user and directly transmitted to the contactless ATM by the communication sticker affixed to the external apparatus and an identification of the external apparatus as associated with the user, based on a recognition of the communication sticker affixed to the external apparatus;

a fifth executable portion configured to create a two-way communication between the contactless ATM and the external apparatus, wherein the two-way communication is a communication between the contactless ATM and the communication sticker affixed to the external apparatus, wherein the communication sticker affixed to the external apparatus provides the communication to the external apparatus;

a sixth executable portion configured to receive financial transaction instructions from an authenticated user associated with the external apparatus via the connection between the contactless ATM and the communication sticker affixed to the external apparatus, wherein financial transactions include withdrawing, depositing, or transferring funds and ordering financial institution products; and a seventh executable portion configured to send financial transaction instructions from the contactless ATM to the authenticated user via the external apparatus using the connection between the contactless ATM and the communication sticker affixed to the external apparatus.

20. The computer program product of claim 19, wherein the third executable portion is configured to initiate a debit account transaction based on at least data comprising authentication information received from the external apparatus.

21. The computer program product of claim 19, wherein the third executable portion is further configured to receive information that identifies a financial account associated with the external apparatus.

22. The computer program product of claim 19, further comprising an eighth executable portion configured to transmit content from the contactless ATM to the external apparatus.

23. The computer program product of claim 22, wherein the eighth executable portion configured to transmit content from the contactless ATM to the external apparatus is configured to transmit a coupon.

24. The computer program product of claim 22, wherein the eighth executable portion configured to transmit content from the contactless ATM to the external apparatus is configured to transmit a receipt associated with the financial transaction instructions.

25. The computer program product of claim 19, further comprising a ninth executable portion configured to receive, via the two-way communication, instructions indicating what type of financial transaction the authenticated user wants to conduct at the contactless ATM.

* * * * *